Patented May 6, 1924.

1,492,920

UNITED STATES PATENT OFFICE.

HAROLD P. KNIGHT, OF BOROSOLVAY, THOMAS M. CRAMER, OF OAKLAND, AND GEORGE A. CONNELL, OF ALAMEDA, CALIFORNIA, ASSIGNORS TO PACIFIC COAST BORAX COMPANY, A CORPORATION OF NEVADA.

PROCESS OF PRODUCING SODIUM BORATES.

No Drawing. Application filed May 25, 1922. Serial No. 563,668.

*To all whom it may concern:*

Be it known that we, HAROLD P. KNIGHT, of Borosolvay, San Bernardino County, THOMAS M. CRAMER, of Oakland, Alameda County, and GEORGE A. CONNELL, of Alameda, Alameda County, all in the State of California, and all citizens of the United States, have invented a certain new and useful Process of Producing Sodium Borates, of which the following is a specification.

The invention relates to a process of producing sodium borates such as sodium tetraborate or borax.

An object of the invention is to provide a process of making borax from a mixture of borax and trona.

Another object of the invention is to provide a process of producing borax from a solution containing sodium carbonate, sodium tetraborate, sodium sesquicarbonate and sodium metaborate.

The invention possesses other advantageous features, some of which, with the foregoing, will be set forth at length in the following description, where we shall outline in full, the process of our invention and one method of carrying it into effect.

We have found that borax ($Na_2B_4O_7$) will react with sodium carbonate ($Na_2CO_3$), in aqueous solution, to form sesquicarbonate of soda ($Na_2CO_3 \cdot NaHCO_3$) and sodium metaborate ($NaBO_2$) in accordance with the following reversible reaction:—

$$4Na_2CO_3 + Na_2B_4O_7 + H_2O = 2(Na_2CO_3 \cdot NaHCO_3) + 4NaBO_2$$

The molecular proportions of this reaction are as follows:—

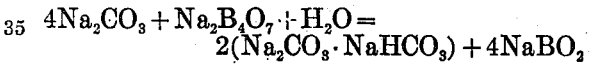

We have found that this reaction takes place under a wide variety of conditions and that the presence in the solution of certain neutral salts, such as sodium chloride, aids in the progress of the reaction by rendering the sodium sesquicarbonate less soluble and thereby causing it to crystallize out of solution.

We make use of this reaction to obtain liquors and natural brines more concentrated with respect to $B_2O_3$, through the conversion of the less-soluble tetraborate to the more soluble metaborate. This can be made to take place, for example, in solar ponds where evaporation is effected at the natural temperatures prevailing, as at Owens Lake and Searles Lake in California.

With a solution containing the components of the reaction represented above, we have found that the addition of carbon dioxide under certain conditions will result in the conversion of monoborate present in solution to borax, and some of this borax will react with the sodium carbonate present to form sodium sesquicarbonate. An equilibrium is established that results in the formation and crystallization of borax and sodium sesquicarbonate together. We have found that this crystallization occurs favorably under temperature conditions ranging from 25° C. to 40° C., but we do not desire to limit ourselves to such temperature range since the mixture may be crystallized out at other temperatures. When it is desirable to increase the yield of the mixture of crystals, the temperature of the carbonated solution may be reduced. When a solution is obtained wherein both the sodium tetraborate and sodium sesquicarbonate are saturated at a given temperature and the solution is maintained at that temperature, the further addition of carbon dioxide will result in the crystallization of a mixture of sodium tetraborate and sodium sesquicarbonate in approximately the molecular proportions given in the above reaction, that is, 202 parts anhydrous sodium tetraborate and 380 parts anhydrous sodium sesquicarbonate.

Such solutions are obtainable from natural saline lakes such as Searles Lake and Owens Lake in California. The liquors from these lakes are saturated or approximately saturated with sodium sesquicarbonate. When the solution or the lake brine is too dilute, that is, when too much water is present to permit the crystallizing out of the sodium tetraborate and sodium sesquicarbonate upon the maximum carbon dioxide addition, the solution or brine is preferably evaporated to saturation with sodium sesquicarbonate and approximate saturation with $B_2O_3$ in the form of borax and monoborate. The carbon dioxide gas should not be introduced into the solution at a greater rate than the rate of crystallization of the sesquicarbonate since a more rapid introduction of the carbon dioxide may result in converting the sesquicarbonate to the bicarbonate. The carbon dioxide reacts both with the sodium carbonate and the sodium metaborate to form sodium sesquicarbonate and sodium tetraborate in accordance with the following reactions:—

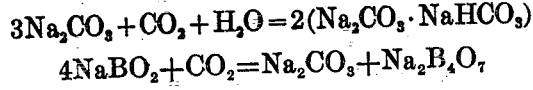

The sesquicarbonate and the tetraborate crystallize out together, forming a mixture of the two salts in approximately molecular proportions, so that it is not commercially practicable or feasible to wash the sesquicarbonate from the mixture.

Mixtures of varying proportions of bicarbonate, trona and borax have been heretofore produced, but, to our knowledge, had no commercial value. We have found that such mixtures, as well as our mixture of sesquicarbonate and borax in approximately molecular proportions, may be advantageously employed in the commercial manufacture of sodium borates, such as borax.

In accordance with our invention, we provide a process of making borax from the mixture of trona and borax, which heretofore has not been commercially separable, and we accomplish this result without producing any material which cannot be readily be separated from the borax. To the mixture of borax and trona in hot aqueous solution, we add a finely divided borate of calcium or magnesium or other element which forms an insoluble carbonate, such as colemanite ($Ca_2B_6O_{11}$). The colemanite reacts with the trona or sesquicarbonate forming borax, (sodium tetraborate), which is soluble in water, and calcium carbonate, which is insoluble and which is readily removed from the solution. The reaction with colemanite is as follows:—

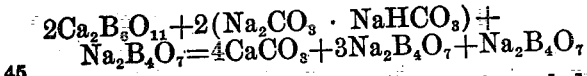

The clarified tetraborate solution is cooled to crystallize out borax.

Throughout the specification, we have used the formulæ of the anhydrous salts, for the purpose of convenience, but it is to be understood that water of crystallization may be present.

We claim:—

1. The method of producing borax which comprises bringing together in hot aqueous solution a borate of an element which forms an insoluble carbonate and an artificially produced mixture containing sodium sesquicarbonate and sodium tetraborate, whereby an insoluble carbonate of the element and a solution of borax are formed, separating the insoluble material from the solution and cooling the solution to cause crystallization of the borax.

2. The method of producing borax which comprises bringing together in hot aqueous solution a borate of an element which forms an insoluble carbonate and a mixture containing sodium sesquicarbonate and sodium tetraborate in substantially molecular proportions, whereby an insoluble carbonate of the element and a solution of borax are formed, separating the insoluble material from the solution and cooling the solution to crystallization.

3. The process of producing borax which comprises treating an aqueous solution containing sodium carbonate, sodium tetraborate, sodium sesquicarbonate and sodium metaborate and substantially saturated with sodium sesquicarbonate to crystallize out sodium sesquicarbonate and sodium tetraborate together and bringing the mixture of crystals into contact with a borate of an element which forms an insoluble carbonate in aqueous solution whereby an insoluble carbonate of the element and a solution of borax are formed, separating the solution and treating it to crystallize out borax.

In witness whereof we have hereunto set our hands the said HAROLD P. KNIGHT, at Borosolvay, California, this 11th day of May, 1922; and the said THOMAS M. CRAMER and GEORGE A. CONNELL, at San Francisco, California, this 8th day of May, 1922.

HAROLD P. KNIGHT.
THOMAS M. CRAMER.
GEORGE A. CONNELL.